United States Patent
Abbiati

(10) Patent No.: US 10,888,869 B2
(45) Date of Patent: Jan. 12, 2021

(54) DEVICES FOR RESETTING POSITIONS OF GRINDING WHEELS IN GRINDERS

(71) Applicant: Gruppo Cimbali S.p.A., Binasco (IT)

(72) Inventor: Giacomo Abbiati, Binasco (IT)

(73) Assignee: GRUPPO CIMBALI S.p.A., Binasco (IT)

(*) Notice: Subject to any disclaimer, the term of this patent is extended or adjusted under 35 U.S.C. 154(b) by 192 days.

(21) Appl. No.: 16/034,404

(22) Filed: Jul. 13, 2018

(65) Prior Publication Data
US 2019/0022660 A1      Jan. 24, 2019

(30) Foreign Application Priority Data

Jul. 18, 2017  (IT) .................. 102017000081189

(51) Int. Cl.
*B02C 7/14*        (2006.01)
*A47J 42/18*       (2006.01)
(Continued)

(52) U.S. Cl.
CPC ............. *B02C 7/14* (2013.01); *A47J 42/18* (2013.01); *A47J 42/26* (2013.01); *A47J 42/44* (2013.01);
(Continued)

(58) Field of Classification Search
CPC .. A47J 42/18; A47J 42/44; A47J 42/26; A47J 42/38; A47J 42/36; B02C 7/16; B02C 7/04; B02C 25/00
See application file for complete search history.

(56) References Cited

U.S. PATENT DOCUMENTS

| | | | | |
|---|---|---|---|---|
| 5,201,474 A | * | 4/1993 | Midden .................. | A47J 42/16 241/100 |
| 5,211,344 A | * | 5/1993 | In Albon ................. | A47J 31/42 241/100 |

(Continued)

FOREIGN PATENT DOCUMENTS

| | | |
|---|---|---|
| DE | 19508780 A1 | 10/1996 |
| EP | 0513759 A1 | 11/1992 |
| WO | 2004/093615 A2 | 11/2004 |

OTHER PUBLICATIONS

Italian Search Report and Written Opinion dated May 3, 2018, in corresponding Italian Patent Application No. 102017000081189,7 pages.

*Primary Examiner* — Faye Francis
(74) *Attorney, Agent, or Firm* — MH2 Technology Law Group LLP

(57) ABSTRACT

A grinder for grinding beans of plant-based products and generating a ground powder can include: a grinding chamber; a wheel motor having a shaft defining an axial direction; a rotating grinding wheel and a stationary grinding wheel housed in the grinding chamber, wherein the rotating grinding wheel is connected to the shaft of the wheel motor and is configured to rotate around the axial direction, and wherein the stationary grinding wheel is stationary against rotation and is configured to axially move in both ways in the axial direction; and a device for resetting position of the rotating and stationary grinding wheels. The device can include: a mechanism for axially moving the stationary grinding wheel; an electric motor, coupled to the mechanism, for actuating the mechanism; and a way to stop the electric motor as soon as a contact state is detected between the stationary and rotating grinding wheels.

20 Claims, 4 Drawing Sheets

(51) Int. Cl.
*A47J 42/26* (2006.01)
*A47J 42/44* (2006.01)
*B02C 7/04* (2006.01)
*B02C 7/16* (2006.01)
*B02C 25/00* (2006.01)

(52) U.S. Cl.
CPC .............. *B02C 7/04* (2013.01); *B02C 7/16* (2013.01); *B02C 25/00* (2013.01)

(56) References Cited

U.S. PATENT DOCUMENTS

| | | | | |
|---|---|---|---|---|
| 5,645,230 | A * | 7/1997 | Marogna | A47J 31/42 241/100 |
| 7,874,505 | B1 * | 1/2011 | Lassota | A47J 42/38 241/259.1 |
| 2004/0200912 | A1 * | 10/2004 | Park | A47J 42/18 241/37 |
| 2007/0187534 | A1 * | 8/2007 | Anson | B02C 7/186 241/92 |
| 2012/0138721 | A1 * | 6/2012 | Hergesell | A47J 31/42 241/277 |
| 2014/0361107 | A1 | 12/2014 | Steiner | |
| 2016/0015214 | A1 * | 1/2016 | Lægdsgaard | A47J 42/10 241/259 |
| 2016/0015215 | A1 * | 1/2016 | Ohta | A47J 42/50 241/47 |

* cited by examiner

US 10,888,869 B2

DEVICES FOR RESETTING POSITIONS OF GRINDING WHEELS IN GRINDERS

CROSS-REFERENCE TO RELATED APPLICATION(S)

This application claims priority under 35 U.S.C. § 119 from Italian Patent Application No. 102017000081189, filed on Jul. 18, 2017, in the Italian Patent and Trademark Office ("IPTO"), the entire contents of which are incorporated herein by reference.

FIELD OF THE INVENTION

The present invention relates to a device for resetting the position of the grinding wheels in a grinder for beans of plant-based products, whose powder, resulting from grinding, is adapted for use in the preparation of a beverage.

Particularly, but without limitation, the ground beans are roasted coffee beans.

BACKGROUND OF THE INVENTION

The grinder comprises a grinding chamber, a pair of grinding wheels housed in said grinding chamber, a grinding wheel of said pair of grinding wheels being connected to the shaft of a motor, whose axis defines the axial direction of the grinding wheels, to be rotated, the other grinding wheel, opposite thereto, being stationary against rotation and susceptible of being axially moved in both ways along said axial direction, a mechanism for imparting said axial movements to said stationary grinding wheel and motor means coupled to said mechanism for actuating it.

The grinder may also be equipped with a dosing device, for dosing the amount of ground product and for subsequently filling a portafilter to obtain the beverage.

In preparing beverages from powders obtained from ground beans of plant-based products, to be dissolved in water, the degree of grinding is known to be a critical aspect, in terms of both the type of beverage and to the organoleptic quality of the beverage, as the extraction of flavors when preparing the beverage depends on the degree of grinding.

This is particularly relevant if the product to be ground for preparing the beverage is roasted coffee, which can be used to obtain different types of coffee, including espresso, brewed coffee and caffè crème.

Bean crushing to various degrees of fineness, according to the type of beverage to be prepared, sometimes causes the grinding wheels to break due to the presence of hard foreign material among the beans, and always causes considerable wear, as a result of which, after a given time, the grinding wheels start to have rounded edges, leading to throughput losses, and degraded ground coffee quality.

This will require relatively frequent replacement of the pair of grinding wheels in the grinding chamber.

Grinding wheel replacement is a rather difficult operation, both because the grinding wheels must be arranged perpendicular to the shaft of the grinding motor that drives the rotating grinding wheel, and because, once the new grinding wheels have been mounted, they must be initialized, i.e. they must undergo a grinding wheel position reset operation, to allow grinding to be carried out with different particle sizes, by moving the stationary grinding wheel toward and away from the rotating grinding wheel, at a predetermined distance therefrom, which is taken as a reference distance.

The grinding wheel position resetting operation is actually a way to determine the zero-distance position of the stationary grinding wheel, which may be taken as a position in which the distance from the rotating grinding wheel is zero.

In the prior art, the grinding wheel position resetting operation is carried out by the user of the grinder when replacing the pair of grinding wheels and includes various steps i.e., according to an empirical method, the steps of rotating the rotating grinding wheel and, during this rotation, actuating the mechanism for axially displacing the stationary grinding wheel toward the rotating grinding wheel until a hiss is heard, which is deemed to represent the moment at which the grinding wheels contact each other, i.e. the zero-distance position of the grinding wheels.

Now, the user moves the stationary grinding wheel back to a predetermined length, as defined in the operation manual of the grinder, still by actuating the mechanism for axially displacing the stationary grinding wheel and placing it at a given distance from the rotating grinding wheel, known as reference distance "dR", relative to which the stationary grinding wheel shall be axially displaced, in either direction, by setting working distances "dL" according to the desired particle size.

It will be appreciated from the foregoing that, according to the prior art method, there is no unique determination of the zero-distance position between the grinding wheels for a given grinder, as such determination depends on the acoustic sensitivity and training of the operator that replaces the grinding wheels and, as a result, the determination of the reference distance dR indicated b the user manual, which depends on the zero-distance position, will not be correct, and a number of subsequent grinding steps will be required, which will lead to an unnecessary waste of product, to determine the particular working distances dL, from which the special particle sizes of the ground product to be used in beverage preparation depend.

SUMMARY OF THE INVENTION

The object of the present invention is to provide a device for resetting the position of the grinding wheels in a grinder as set forth hereinbefore, which allows unique initialization of a new pair of grinding wheels, regardless of the training and acoustic sensitivity of the operator that replaced the pair of grinding wheels, while obviating the drawbacks caused by the prior art.

This and other objects, as better explained hereafter, are fulfilled by a device for determining the zero-distance position between the grinding wheels of a new pair of grinding wheels, for resetting the position of the grinding wheels in a grinder for beans of plant-based products, whose powder, resulting from grinding, is adapted for use in the preparation of a beverage. The grinder comprises a grinding chamber, a pair of grinding wheels housed in said grinding chamber, a grinding wheel of said pair of grinding wheels being connected to the shaft of a motor, whose axis defines the axial direction (Z-Z) of the grinding wheel to be rotated, the other grinding wheel, opposite thereto, being stationary against rotation, and susceptible of being axially moved in both ways in said axial direction (Z-Z). The grinder also comprises a mechanism for imparting said axial movements to said stationary grinding wheel, an electric motor coupled to said mechanism, means for stopping the action of said motor as soon as a contact state is detected between the stationary grinding wheel and the rotating grinding wheel. For detecting said contact state and stopping the action of said motor, the grinder is provided with a current intensity meter for measuring the current intensity absorbed by said electric motor and with a switch for cutting off power to said electric motor upon detection of a value of the current intensity absorbed by said motor representative of the zero-distance position between the stationary grinding wheel and the rotating grinding wheel, opposite thereto.

BRIEF DESCRIPTION OF THE DRAWINGS

The invention will be now described in greater detail with reference to certain embodiments thereof, given by way of illustration and without limitation, and shown in the annexed drawings in which.

DETAILED DESCRIPTION OF THE INVENTION

Figure 1:
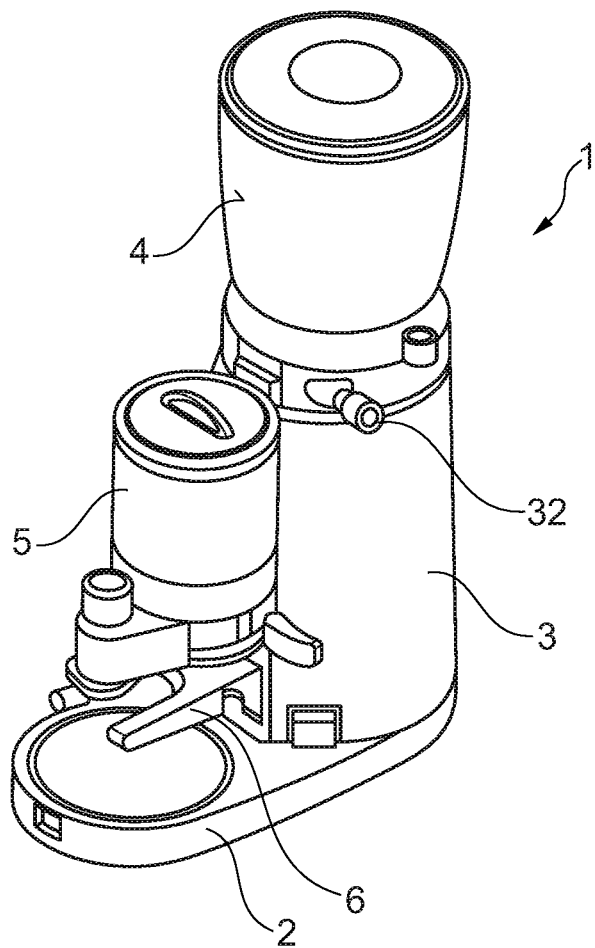
FIG. 1 shows a schematic perspective view of a conventional grinder-doser for grinding roasted coffee.

Referring to the above figures, and particularly to FIG. 1, the grinder, generally designated by numeral 1, comprises a base 2, a body 3 in which a grinding chamber, not shown, is accommodated, as is known in the art, a pair of grinding wheels, i.e. a stationary grinding wheel and a rotating grinding wheel, operating therein, the latter being rotated by an electric motor, also accommodated in the body 3 as is known in the art.

A hopper 4 is situated above the body 3 for containing and feeding the beans to be ground, namely coffee beans, to the grinding wheels.

The grinder 1 may be equipped with a doser 5 for dosing the ground product and a conventional support 6 for receiving a portafilter, the latter not shown in the drawing of FIG. 1.

Figure 2:
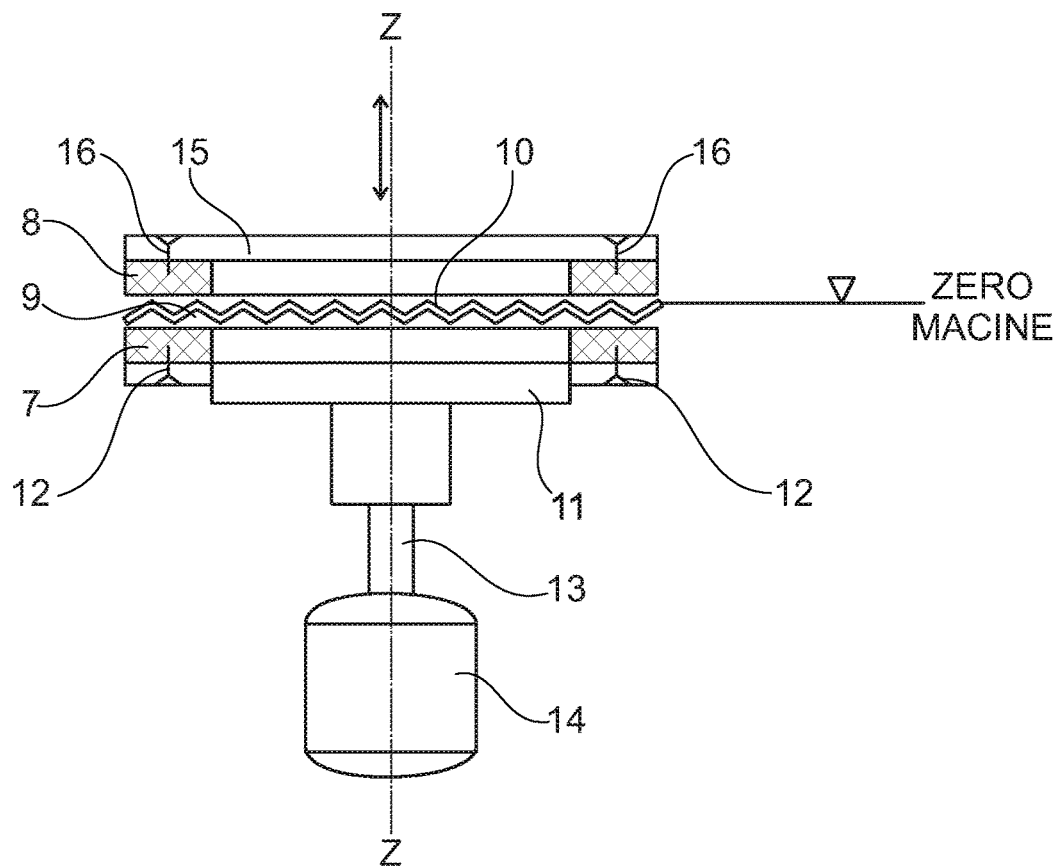
FIG. 2 shows a schematic view, illustrating the mutual positioning of the grinding wheels in the grinding chamber of the grinder with the motor for actuating the rotating grinding wheel.

The pair of grinding wheels designed to operate in the grinding chamber is schematically illustrated in FIG. 2 in which the rotating grinding wheel has been designated by numeral 7 and the stationary grinding wheel, which is stationary against rotation, but can be axially displaced as set forth below, has been designated by numeral 8. Both grinding wheels have conventional teeth, schematically referenced 9 and 10 respectively.

The rotating grinding wheel 7 is conventionally connected to a support, schematically referenced 11, e.g. by means of connecting screws 12 and, via this support, is connected to the shaft 13 of an electric motor 14.

The shaft 13 of the electric motor 14 defines the axial direction Z-Z along which the stationary grinding wheel 8 is displaced and is also carried by a respective support 15 to which it is connected, for instance, by means of screws 16.

As shown in FIG. 2, when the teeth 9 and 10 of the grinding wheels 7 and 8 come to wiping contact with each other and generate a hiss, they define the zero-distance position between the grinding wheels.

Figure 4:
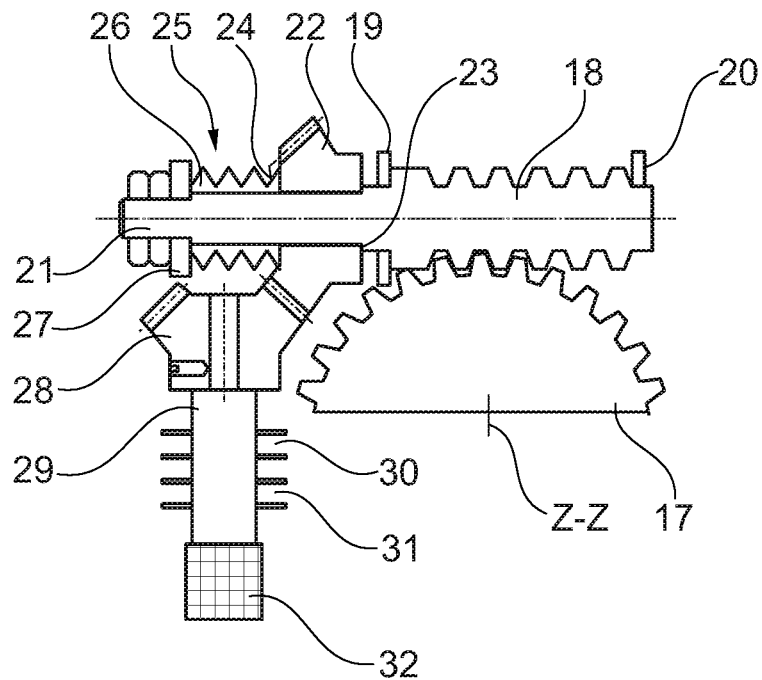
FIG. 4 shows a first embodiment of the device of the invention, for initializing the pair of grinding wheels by manual actuation.
Figure 5:
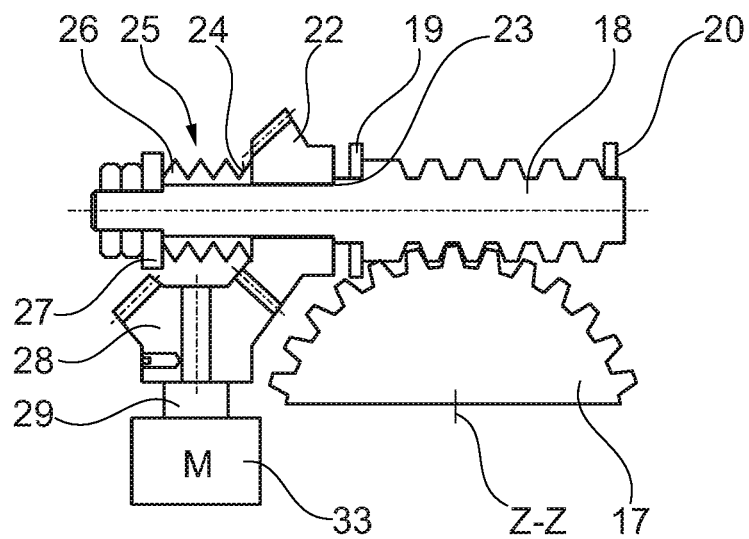
FIG. 5 shows a second embodiment of the device of the invention, for initializing the pair of grinding wheels by actuation using an electric motor.

According to the present invention, the aforementioned zero-distance position between the grinding wheels 7 and 8 is achieved by means of the device as shown in FIGS. 4 and 5.

Referring to FIG. 4, numeral 17 designates a conventional gearwheel which forms with a threaded gear, not shown, the conventional mechanism for imparting axial displacements to the stationary grinding wheel 8 along the axis Z-Z that coincides with the axis of the shaft 13 of the motor 14 that rotates the rotating grinding wheel 7.

An Archimedean screw, referenced 18, is connected to the gearwheel 17, and is mounted between the end supports, schematically referenced 19 and 20.

A bevel gear 22 is idly fitted on the shank end 21 of the screw 18 and may slide between a shoulder 23 of the screw 18 and the end 24 of an elastic member 25, e.g. a stack of cup springs arranged coaxially with the shank end 21, whose other end 26 acts against a locking plate 27 attached to the shank end 21.

The axial elastic force exerted by the elastic member 25 will keep the bevel gear 22 normally adhered to the shoulder 23, thereby causing it to be rigidly joined to the shank end 21 and hence to the screw 18.

The members 22, 23, 24, 25, 26, 27 actually form a friction system.

The bevel gear 22 is rotatably engaged with a second bevel gear 28, which is fitted and rigidly joined to a shaft 29 mounted to supports, referenced 30 and 31.

As shown in the embodiment of FIG. 4, the shaft 29 ends with a knob 32 for manual rotary actuation thereof.

Relative to the grinder 1, the aforementioned shaft 29 may be designed to be accessed from outside the body 3, in which the knob 32 may be placed.

Referring to the embodiment of FIG. 5, the shaft 29 is connected to an electric motor 33 for automated operation of the device.

The electric motor 33 is preferably a DC or stepped motor, for rotation of the shaft 29 in both ways.

The determination of the zero-distance position between the grinding wheels, i.e. the initialization of a new pair of grinding wheels, using the device of the invention, is carried out by imparting a rotation to the shaft 29, i.e. acting manually on the knob 32, or electrically via the motor 33.

The rotation of the shaft 29 via the screw 18 and the gearwheel 17, and the conventional mechanism for axially displacing the stationary grinding wheel 8 in the direction of the axis Z-Z, moves said stationary grinding wheel 8 toward the rotating grinding wheel 7 while the latter is not necessarily rotated.

The rotation of the shaft 29 according to the invention, either obtained by manual actuation via the knob 32 or by motorized actuation via the motor 33, continues until the elastic member 25 detects that the bevel gear 22 and the corresponding shoulder 23 of the screw 18 have a resistant torque therebetween that exceeds the driving torque generated by the calibration elastic energy that has been stored.

Assuming that the contact condition between the stationary grinding wheel 8 and the one opposed thereto, i.e. the rotating grinding wheel 7, corresponds to the aforementioned resistant torque, as the bevel gear 22 loses friction contact against the shoulder 23, it stops motion transfer to the screw 18 even when the rotation of the shaft 29 continues.

The Applicant could find that, with the most common types of grinding wheels, i.e. those having a diameter of 65 millimeters ("mm"), the resistant torque representative of the contact between the grinding wheels, i.e. representative of the zero-distance position of the grinding wheels, ranges from 16 kilogram-centimeters ("kg-cm") to 19 kg-cm.

Therefore, with the device of the invention, the "grinding wheel zero-distance" position is uniquely determined.

Once the aforementioned "grinding wheel zero-distance" position has been uniquely determined, the reference distance dR and the working distances dL for the various grinding particle sizes also may be uniquely determined with displacements of the stationary grinding wheel 8 based on the instructions programmed in the grinder or indicated in the operation manual thereof, and not through various grinding attempts which would lead to unnecessary product and time waste.

Figure 3:
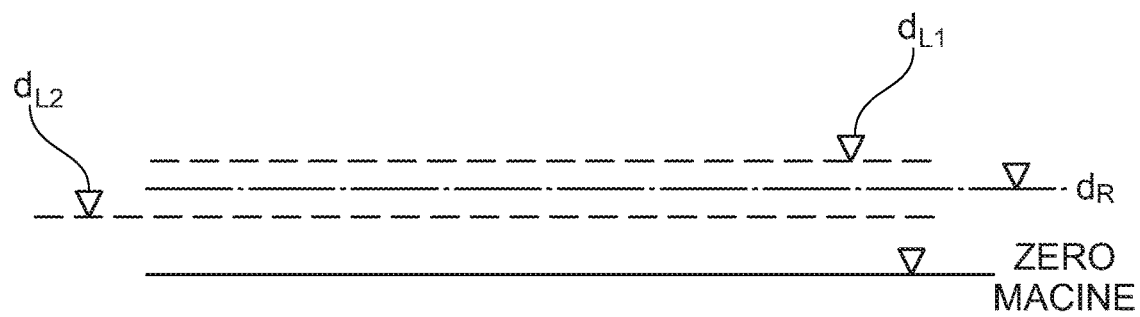
FIG. 3 shows a schematic view illustrating the positions taken by the stationary grinding wheel during initialization of the pair of grinding wheels during replacement due to wear or failure.

FIG. 3 schematically shows the representative "grinding wheel zero-distance" line, the backward position representative of the reference distance dR, as well as two lines, referenced dL1 and dL2 respectively, representative of working distances that provide different particle sizes, i.e. one, dL1, obtained by placing the stationary grinding machine at a distance from the "grinding wheel zero-distance" line that exceeds the distance represented by the working distance dL2, both straddling the uniquely determined reference distance dR.

Figure 6:
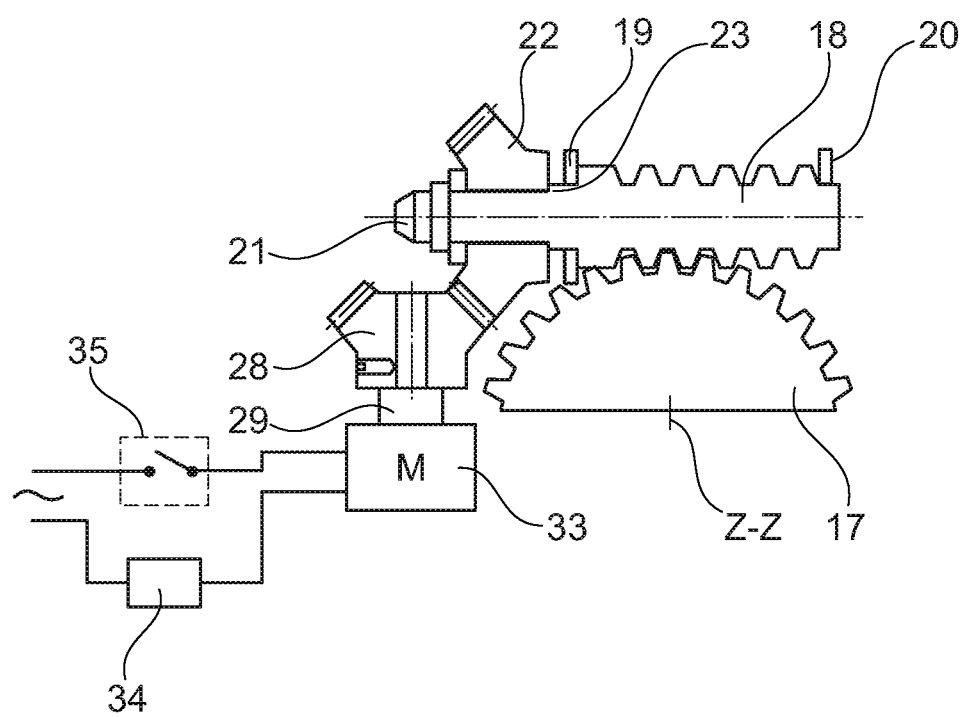
FIG. 6 shows an alternative embodiment of the device of the invention, for initializing a pair of grinding wheel by actuation using an electric motor and a current intensity meter.

In one alternative embodiment of the present invention, with reference to FIG. 6, the device for initializing a new pair of grinding wheels, instead of an elastic member like the elastic member 25 of FIG. 5, comprises a meter 34 for measuring the current intensity absorbed by the electric motor 33 and a switch 35 to stop power supply to the electric motor 33 when detecting a value of the current intensity absorbed by said electric motor 33 which represents the zero-distance position between the stationary grinding wheel 8 and the rotating grinding wheel 7, opposed thereto.

The Applicant has found that for the most common types of grinding wheels, i.e. those having a diameter of 65 mm, the value of the electric current absorbed by the electric motor 33 which represents the zero-distance position of the grinding wheels, ranges from 5 to 6 times the nominal value of the current intensity absorbed by the electric motor 33 during its normal operation, i.e. the value of the electric current absorbed by the electric motor 33 which represents the zero-distance position of the grinding wheels is from 2,500 milliamps ("mA") to 3,000 mA.

The operation of the device of the invention is suitable to be also actuated with programmed modes in a conventional electronic control unit (CPU) which is used to uniquely determine the "grinding wheel zero-distance" position, by detecting a predetermined value of the current absorbed by the motor designed to axially displace the stationary grinding wheel, and then the reference distance dR and the working distances dL1 and/or dL2, by programming the number of revolutions to be imparted in either direction to the stepping motor 33. For this purpose, the latter shall be intended to be equipped with an electronic rpm sensor, not shown, preferably consisting of an encoder.

Electronic programming of the reference distance dR and the working distances dL1 and dL2 may be made available even in the embodiment of the device as shown in FIG. 5, by equipping the motor 33 with an encoder.

What is claimed is:

1. A grinder for grinding beans of plant-based products and generating a ground powder, the grinder comprising:
a grinding chamber;
a wheel motor having a shaft defining an axial direction;
a rotating grinding wheel and a stationary grinding wheel housed in the grinding chamber, wherein the rotating grinding wheel is connected to the shaft of the wheel motor and is configured to rotate around the axial direction, and wherein the stationary grinding wheel is stationary against rotation and is configured to axially move in both ways in the axial direction; and
a device for resetting position of the rotating grinding wheel and the stationary grinding wheel;
wherein the device comprises:
a mechanism for axially moving the stationary grinding wheel;
an electric motor, coupled to the mechanism, for actuating the mechanism; and
means for stopping the electric motor as soon as a contact state is detected between the stationary grinding wheel and the rotating grinding wheel, wherein the means comprises a current intensity meter for measuring current intensity absorbed by the electric motor and a switch for cutting off power to the electric motor upon detection of a value of the current intensity absorbed by the electric motor representative of a zero-distance state between the stationary grinding wheel and the rotating grinding wheel.

2. The grinder of claim 1, wherein the electric motor is equipped with an encoder.

3. The grinder of claim 1, wherein the device further comprises:
a friction system between the electric motor and the mechanism.

4. The grinder of claim 3, wherein the friction system comprises a bevel gear.

5. The grinder of claim 3, wherein the friction system comprises an elastic member.

6. The grinder of claim 1, wherein the stationary grinding wheel has a diameter of 65 millimeters (mm),
wherein the rotating grinding wheel has a diameter of 65 mm, and
wherein the value of the current intensity absorbed by the electric motor, representative of the zero-distance state between the stationary grinding wheel and the rotating grinding wheel, ranges from 5 to 6 times a nominal value of the current intensity absorbed by the electric motor during normal operation.

7. The grinder of claim 1, wherein the stationary grinding wheel has a diameter of 65 millimeters (mm),
wherein the rotating grinding wheel has a diameter of 65 mm, and
wherein the value of the current intensity absorbed by the electric motor, representative of the zero-distance state between the stationary grinding wheel and the rotating grinding wheel, ranges from 2,500 milliamps (mA) to 3,000 mA.

8. The grinder of claim 1, further comprising:
a dosing device for dosing the ground powder.

9. The grinder of claim 1, wherein the electric motor is equipped with a rotation rate sensor.

10. The grinder of claim 1, wherein the electric motor is equipped with an electronic rotation rate sensor.

11. The grinder of claim 1, wherein the stationary grinding wheel has a diameter of 65 millimeters (mm).

12. The grinder of claim 1, wherein the rotating grinding wheel has a diameter of 65 millimeters (mm).

13. The grinder of claim 1, wherein the stationary grinding wheel has a diameter of 65 millimeters (mm), and wherein the rotating grinding wheel has a diameter of 65 mm.

14. The grinder of claim 1, further comprising:
a dosing device for receiving a portafilter.

15. The grinder of claim 1, further comprising:
a dosing device for filling a portafilter.

16. The grinder of claim 1, wherein the electric motor comprises a direct current (DC) motor.

17. The grinder of claim 1, wherein the electric motor comprises a stepped motor.

18. The grinder of claim 1, wherein the mechanism comprises a gearwheel.

19. The grinder of claim 1, wherein the mechanism comprises an Archimedean screw.

20. The grinder of claim 1, wherein the mechanism comprises a gearwheel and an Archimedean screw.

* * * * *